(12) United States Patent
Sakai

(10) Patent No.: US 7,699,474 B2
(45) Date of Patent: Apr. 20, 2010

(54) TWO LIGHT SOURCE TYPE PROJECTOR

(75) Inventor: Kenshi Sakai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 16 days.

(21) Appl. No.: 12/262,913

(22) Filed: Oct. 31, 2008

(65) Prior Publication Data

US 2009/0116117 A1    May 7, 2009

(30) Foreign Application Priority Data

Nov. 1, 2007   (JP) .............................. 2007-284770

(51) Int. Cl.
    *G03B 21/26* (2006.01)
    *G03B 21/14* (2006.01)
    *G02B 27/10* (2006.01)
    *G02F 1/1335* (2006.01)
    *F21V 7/00* (2006.01)

(52) U.S. Cl. .............................. 353/37; 353/38; 353/31; 353/94; 359/619; 349/8; 362/247; 362/296.01; 362/341

(58) Field of Classification Search ................... 353/37, 353/38, 31, 94; 359/619; 349/8; 362/247, 362/296.01, 341
See application file for complete search history.

(56) References Cited

U.S. PATENT DOCUMENTS 6,222,674 B1   4/2001   Ohta
6,224,217 B1 *   5/2001   Tanaka .......................... 353/94
6,517,212 B2 *   2/2003   Satou ............................ 353/99
6,585,380 B2 *   7/2003   Yamamoto .................... 353/98
7,125,144 B2 *   10/2006   Shimaoka et al. ........... 362/243
2002/0030795 A1 *   3/2002   Yamamoto .................... 353/94

FOREIGN PATENT DOCUMENTS

| JP | 2000-003612 A | 1/2000 |
| JP | 2000-171901 A | 6/2000 |
| JP | 2002-072083 A | 3/2002 |
| JP | 2007-108625 A | 4/2007 |
| JP | 2007-249136 A | 9/2007 |

* cited by examiner

*Primary Examiner*—Georgia Y Epps
*Assistant Examiner*—Magda Cruz
(74) *Attorney, Agent, or Firm*—Oliff & Berridge, PLC

(57) ABSTRACT

A projector includes a lighting device having two light source devices each having an ellipsoidal reflector disposed such that the ellipsoidal reflectors face each other, a reflection system that reflects illumination lights emitted from the two light source devices substantially in the same direction, an electro-optic modulating device that modulates the light released from the lighting device according to image information; and a projection system that projects light modulated by the electro-optic modulating device. The two light source devices are disposed such that the respective light source optical axes of the two light source devices are substantially perpendicular to the projection optical axis of the projection system. The reflection system is constructed such that the center axes of the respective illumination lights emitted from the two light source devices and entering a converging lens are inclined toward the illumination optical axis of the lighting device by a predetermined angle.

9 Claims, 5 Drawing Sheets

TWO LIGHT SOURCE TYPE PROJECTOR

This application claims priority to JP 2007-284770 filed in Japan on Nov. 1, 2007, the disclosure of which is hereby incorporated by reference in its entirety.

BACKGROUND

1. Technical Field

The present invention relates to a projector.

2. Related Art

Currently, there is a demand for development of high-luminance-type projectors. For meeting this demand, a projector having two light source devices (so-called two light source type projector) has been proposed (for example, see JP-A-2000-3612). According to the projector disclosed in JP-A-2000-3612, each of the two light source devices has an ellipsoidal reflector and an arc tube, and the ellipsoidal reflectors of these light sources face each other. Illumination lights emitted from the two light source devices are reflected toward a converging lens and a light equalizing system disposed downstream by using a triangular prism having two reflection surfaces orthogonal to each other. Each converging spot of the ellipsoidal reflectors exists on the corresponding reflection surface of the triangular prism. The light equalizing system is a lens integrator system which includes a first lens array having a plurality of first small lenses for dividing light coming from the converging lens into a plurality of partial lights, and a second lens array having second small lenses corresponding to the respective first small lenses of the first lens array.

The two light source type projector having this structure in the related art is a high-luminance projector since two light source devices are provided.

With a recent increase in the number of high-luminance-type projectors, there is a further demand for projectors providing higher light utilization efficiency.

SUMMARY

It is an advantage of some aspects of the invention to provide a projector capable of improving light utilization efficiency.

For achieving the above advantage, the present inventors executed a thorough investigation of what elements have been preventing improvement of light utilization efficiency in the related-art projector. After the investigation, the inventors found that one of the elements is that two arc images cannot be contained within each lens cell of the second small lenses but project out of the cell. More specifically, two arc images corresponding to two light source devices are formed on each of the second small lenses in the related-art projector, but these two arc images cannot be formed inside the lens cell of the corresponding second small lenses due to the positions of the converging spots of the two ellipsoidal reflectors away from each other on the reflection surfaces of the triangular prism. In this case, the two arc images project out of each lens cell, and thus light utilization efficiency lowers.

For forming the two arc images inside the corresponding lens cell of the second small lenses, it is possible to use a relatively small triangular prism. In this case, the positions of the converging spots of the ellipsoidal reflectors included in the two light source devices come close to each other. Thus, the two arc images can be contained in the corresponding lens cell of the second small lenses. However, the illumination light emitted from the light source device has a certain size even at the converging spot, and cannot be sufficiently reflected by the reflection surface of the triangular prism. As a result, light utilization efficiency lowers.

Alternatively, it is possible to dispose the converging spots of the ellipsoidal reflectors in the vicinity of the illumination light optical axis of the lighting device without changing the size of the triangular prism. In this case, the converging spots of the ellipsoidal reflectors are located close to each other. However, the illumination lights emitted from the light source devices are not sufficiently reflected by the reflection surface of the triangular prism similarly to the above case, and thus light utilization efficiency lowers.

To overcome these problems, the inventors repeatedly executed investigations to find an appropriate technique for forming the two arc images inside the corresponding lens cell of the second small lenses by method other than the above examples. Finally, the inventors found that the two arc images can be formed within the corresponding lens cell of the second small lenses by disposing the center axes of the respective illumination lights emitted from the two light sources and entering the converging lens in such positions as to be inclined toward the illumination optical axis of the lighting device by a predetermined angle. As a result, higher light utilization efficiency than that of the related-art structure can be provided.

A projector according to a first aspect of the invention includes: a lighting device which includes two light source devices each of which has an ellipsoidal reflector and an arc tube having a light emission center in the vicinity of a first focus of the ellipsoidal reflector and is disposed such that the two ellipsoidal reflectors face each other, a reflection system which has a reflection surface in the vicinity of a second focus of the ellipsoidal reflector and reflects illumination lights emitted from the two light source devices substantially in the same direction, a converging lens which guides the illumination light coming from the reflection system to an optical element disposed downstream, a first lens array which has a plurality of first small lenses for dividing the light guided by the converging lens into a plurality of partial lights, a second lens array which has second small lenses corresponding to the first small lenses of the first lens array, and a superimposing lens which superimposes the respective partial lights released from the second lens array on an illumination target area; an electro-optic modulating device which modulates the light released from the lighting device according to image information; and a projection system which projects light modulated by the electro-optic modulating device. The two light source devices are disposed in such positions that the respective light source optical axes of the two light source devices are substantially perpendicular to the projection optical axis of the projection system. The reflection system is constructed such that the center axes of the respective illumination lights emitted from the two light source devices and entering the converging lens are inclined toward the illumination optical axis of the lighting device by a predetermined angle.

According to this structure, the projector includes the reflection system constructed such that the center axes of the respective illumination lights emitted from the two light source devices and entering the converging lens are inclined toward the illumination optical axis of the lighting device by the predetermined angle. Thus, two arc images can be formed inside the corresponding lens cell of the second small lenses. Accordingly, higher light utilization efficiency than that of the related-art structure can be provided.

According to the projector having this structure, the positions of the converging spots of the respective ellipsoidal reflectors do not come close to each other due to the relatively compact triangular prism. Thus, the problem that the illumination lights emitted from the respective light source devices are not sufficiently reflected is not caused. In other words, according to this projector, the illumination lights emitted from the light source devices can be securely reflected toward the converging lens disposed downstream by using the reflection system having this structure.

When a projector is used in a classroom or a meeting room, as is often the case, the projector is chiefly installed horizontally such that an image is projected in the horizontal direction. In recent years, however, the purpose of use of the projector has become diversified, and the possibility that an image is required to be projected in a direction other than the horizontal direction is increasing. In this case, the projector is disposed not in the horizontal direction but in the direction coinciding with the desired image projection direction.

According to the related-art two light source type projector which includes the projection system facing in the direction of the ceiling, however, the two light source devices are disposed such that the respective light source optical axes become substantially parallel with the projection optical axis of the projection system. In this case, the arc tube of each light source stands up in the vertical direction. As a result, deviation from the secured range of the structure installed in the horizontal direction is caused, and unfavorable phenomena such as heat generated by the arc tube may occur.

According to the projector of the first aspect of the invention, however, the two light source devices are disposed such that the respective light source optical axes become substantially perpendicular to the projection optical axis of the projection system. Thus, deviation from the secured range of the structure installed in the horizontal direction is not caused even when the projector is installed such that the projection system faces the ceiling. As a result, unfavorable phenomena such as heat generated by the arc tube can be prevented.

It is preferable that, when the angle formed by the center axis of the illumination light emitted from one of the two light source devices and entering the converging lens and the center axis of the illumination light emitted from the other light source device of the two light source devices and entering the converging lens is $\theta$, it is preferable that the relation $0.5° \leq \theta \leq 4°$ holds.

When the angle $\theta$ is in the range of $0.5° \leq \theta \leq 4°$, higher light utilization efficiency than the related-art structure can be provided as can be seen from an experiment example to be described later.

It is preferable that the reflection system is a reflection prism which has a first reflection surface for reflecting the illumination light emitted from one of the two light source devices toward the converging lens, and a second reflection surface for reflecting the illumination light emitted from the other light source device of the two light source devices toward the converging lens. In this case, when the angle formed by the first reflection surface and the second reflection surface is $\alpha$, it is preferable that the relation $90.5° \leq \alpha \leq 94°$ holds.

According to this structure, the center axes of the respective illumination lights emitted from the two light source devices and entering the converging lens can be inclined toward the illumination optical axis of the lighting device by a predetermined angle even when the two light source devices are disposed such that the respective ellipsoidal reflectors face each other and that the respective light source optical axes become substantially perpendicular to the illumination optical axis. Thus, higher light utilization efficiency than the related-art structure can be provided by the projector.

It is preferable that the reflection system includes a first bending system which has three reflection elements for reflecting the illumination light emitted from one of the light source devices of the two light source devices toward the converging lens, and a second bending system which has three reflection elements for reflecting the illumination light emitted from the other light source device toward the converging lens.

According to this structure, the center axes of the respective illumination lights emitted from the two light source devices and entering the converging lens can be inclined toward the illumination optical axis of the lighting device by a predetermined angle similarly to the above example. Thus, higher light utilization efficiency than the related-art structure can be provided by the projector.

Moreover, the projector which includes the reflection system having the first bending system and the second bending system constructed as above can be made compact.

It is preferable that the reflection element disposed at the rearmost position of the positions of the three reflection elements of the first bending system on the optical path is disposed at a position different from the position of the reflection element disposed at the rearmost position of the positions of the three reflection elements of the second bending system on the optical path in the direction of the illumination optical axis of the lighting device.

When the reflection system having six reflection elements in total is used, the reflection element disposed at the rearmost position of the three reflection elements of the first bending system on the optical path and the reflection element disposed at the rearmost position of the three reflection elements of the second bending system on the optical path are located at the same position in the illumination optical axis direction of the lighting device (in this case, the expression "located at the same position" refers not to the condition in which the two elements overlap with each other but to the condition in which the two elements are positioned side by side in the direction orthogonal to the illumination optical axis). In this case, there is a possibility that a part of the light entering one of the two reflection elements is deviated by the other reflection element.

According to the projector of the first aspect of the invention, however, the reflection element disposed at the rearmost position of the three reflection elements of the first bending system on the optical path and the reflection element disposed at the rearmost position of the three reflection elements of the second bending system on the optical path are located at different positions in the illumination optical axis direction of the lighting device. Thus, the problem of deviation can be reduced.

BRIEF DESCRIPTION OF THE DRAWINGS

The invention will be described with reference to the accompanying drawings, wherein like numbers reference like elements.

DETAILED DESCRIPTION OF EMBODIMENTS

A projector according to an embodiment of the invention is hereinafter described with reference to the drawings.

First Embodiment

Figure 1:
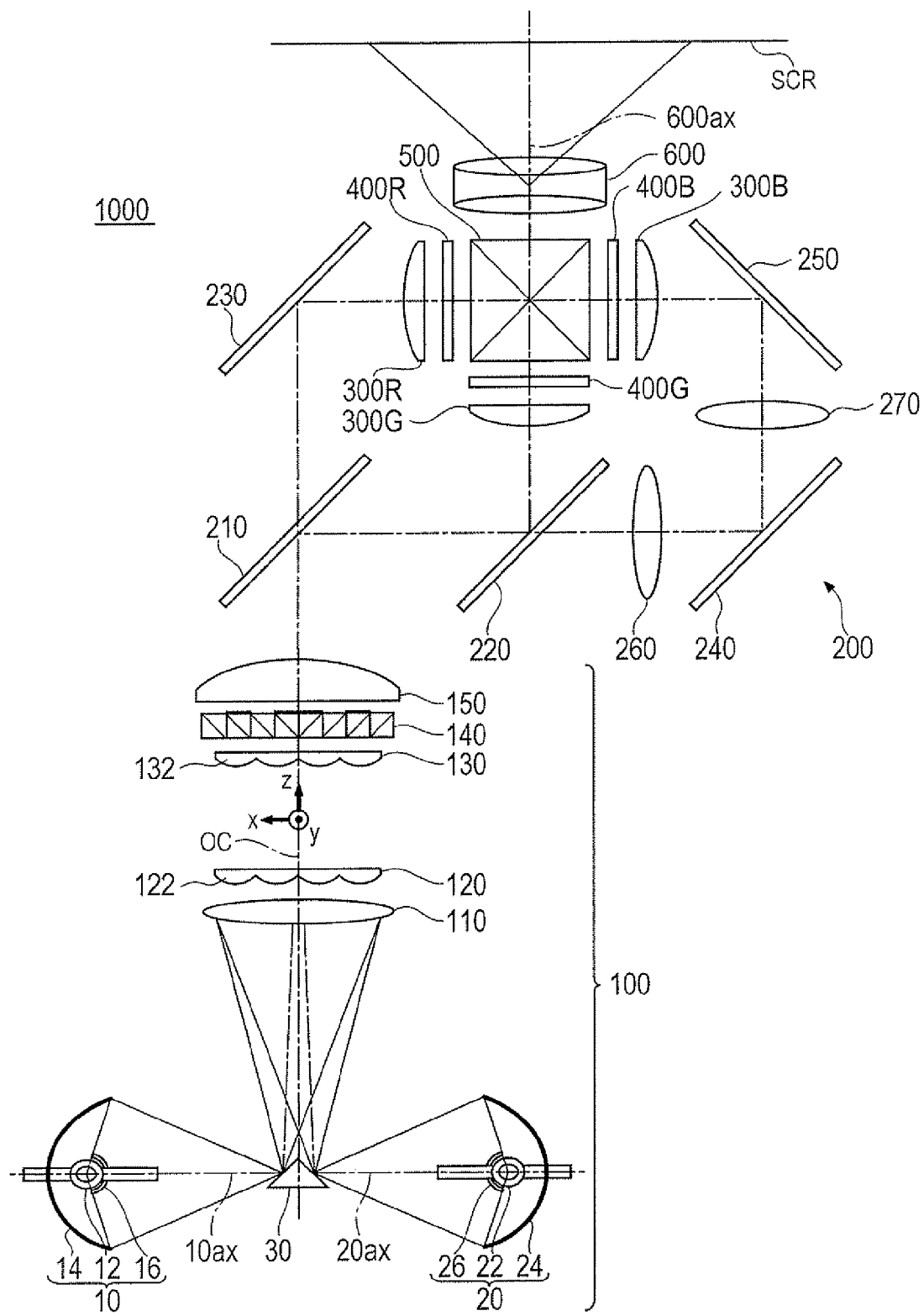
FIG. 1 illustrates optical systems included in a projector 1000 according to a first embodiment.

FIG. 1 illustrates optical systems of a projector 1000 according to a first embodiment.

Figure 2:
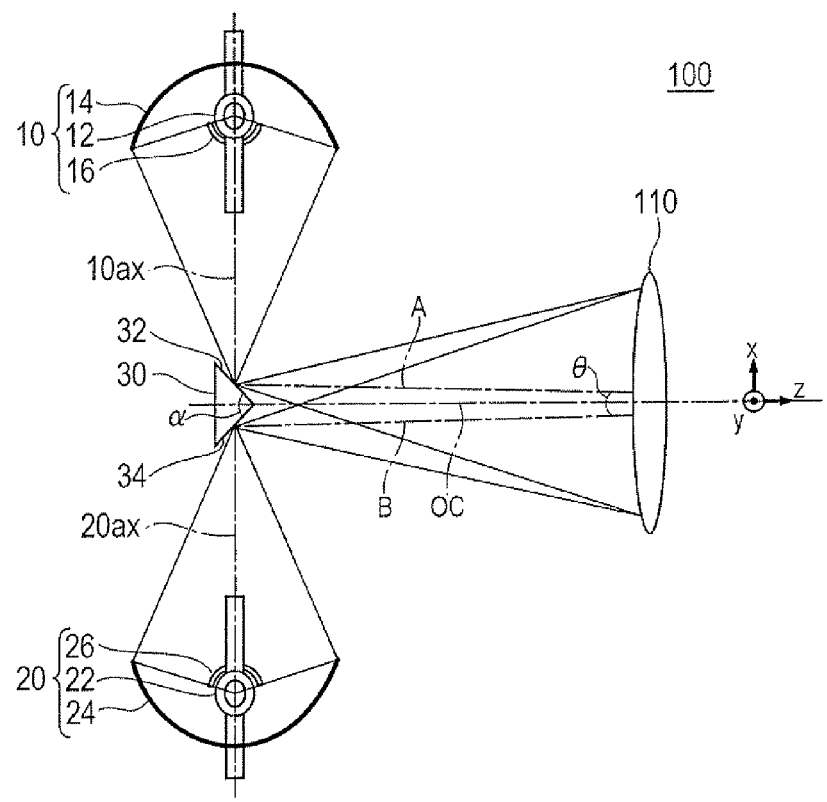
FIG. 2 is a view explaining the projector 1000 according to the first embodiment.

FIG. 2 is a view explaining the projector 1000 according to the first embodiment.

In the following description, three directions orthogonal to one another are z-axis direction (illumination optical axis OC direction in FIG. 1), x-axis x-axis direction (direction parallel with the sheet surface of FIG. 1 and orthogonal to z-axis), and y-axis direction (direction perpendicular to the sheet surface of FIG. 1 and orthogonal to the z-axis).

As illustrated in FIG. 1, the projector 1000 in the first embodiment includes a lighting device 100, a color separating and guiding system 200 which separates illumination light emitted from the lighting device 100 into three color lights and guides the color lights to an illumination target area, three liquid crystal light modulating devices 400R, 400G and 400B as electro-optic modulating devices for modulating the three color lights separated by the color separating and guiding system 200 according to image information, a cross dichroic prism 500 as a color combining system for combining the color lights modulated by the liquid crystal light modulating devices 400R, 400G and 400B, and a projection system 600 for projecting the light combined by the cross dichroic prism 500 on a projection surface such as a screen SCR. Thus, the projector 1000 is a so-called two light source type projector.

As illustrated in FIGS. 1 and 2, the lighting device 100 has two light source devices 10 and 20, a reflection prism 30 as a reflection system for reflecting illumination lights emitted from the two light source devices 10 and 20 substantially in the same direction, a converging lens 110 for guiding the illumination lights released from the reflection prism 30 toward optical elements disposed downstream, a first lens array 120 having first small lenses 122 for dividing the light guided by the converging lens 110 into a plurality of partial lights, a second lens array 130 having second small lenses 132 corresponding to the respective first small lenses 122 of the first lens array 120, a polarization converting element 140 for converting the respective partial lights released from the second lens array 130 into lights having substantially one type of linear polarization component, and a superimposing lens 150 for superimposing the respective lights released from the polarization converting element 140 on the illumination target area.

The light source device 10 has an ellipsoidal reflector 14, an arc tube 12 having an emission center in the vicinity of a first focus of the ellipsoidal reflector 14, and a sub mirror 16 as a reflection unit. The light source device 10 emits light having a light source optical axis 10ax as the center axis.

The arc tube 12 has a tube spherical portion, and a pair of sealing portions extending from both sides of the tube spherical portion. The tube spherical portion is made of spherical quartz glass, and has a pair of electrodes disposed inside the spherical portion, and mercury, rare gas, and a small amount of halogen sealed into the tube spherical portion. The arc tube 12 may be constituted by metal halide lamp, high pressure mercury lamp, extra-high pressure mercury lamp, or other various types of arc tubes.

The ellipsoidal reflector 14 has an opening through which one of the sealing portions of the arc tube 12 is inserted and fixed to this sealing portion, and a reflection concave surface which reflects light emitted from the arc tube 12 toward a second focus position.

The sub mirror 16 is a reflection unit covering substantially half of the tube spherical portion of the arc tube 12 and is disposed opposed to the reflection concave surface of the ellipsoidal reflector 14. The sub mirror 16 has an opening through which the other sealing portion of the arc tube 12 is inserted and fixed to this sealing portion, and a reflection concave surface which reflects light released in the direction of the illumination target area from the tube spherical portion toward the tube spherical portion. The light reflected by the sub mirror 16 passes through the arc tube 12 and enters the ellipsoidal reflector 14.

The other light source device 20 has a structure similar to that of the light source device 10, and thus detailed explanation of the light source device 20 is not repeated.

The two light source devices 10 and 20 are disposed such that the ellipsoidal reflectors 14 and 24 face each other.

The reflection prism 30 has a triangle pole shape having two reflection surfaces on the side surfaces. More specifically, the reflection prism 30 has a first reflection surface 32 which reflects illumination light from the light source device 10 toward the converging lens 110, and a second reflection surface 34 which reflects illumination light from the light source device 20 toward the converging lens 10. The reflection prism 30 is disposed such that the first reflection surface 32 and the second reflection surface 34 are positioned in the vicinity of the second focuses of the ellipsoidal reflectors 14 and 24. An angle α formed by the first reflection surface 32 and the second reflection surface 34 is 92°, for example. The reflection prism 30 is disposed such that the bisector of the angle α substantially coincides with the illumination optical axis OC.

The converging lens 110 is an optical element which substantially collimates the illumination light released from the reflection prism 30 and guides the collimated light to the first lens array 120. The converging lens 110 is disposed such that the optical axis of the converging lens 110 substantially coincides with the illumination optical axis OC of the lighting device 100. The converging lens 110 may be constituted by a compound lens having a plurality of lenses.

The first lens array 120 has a function of dividing the light released from the converging lens 110 into a plurality of partial lights as a light dividing optical element. The plural first small lenses 122 of the first lens array 120 are arranged in a matrix having four lines and six rows on a plane perpendicular to the z axis. The contour shape of each of the first small lenses 122 has a shape substantially similar to the shape of each image forming area of the liquid crystal light modulating devices 400R, 400G and 400B.

Figure 4A:
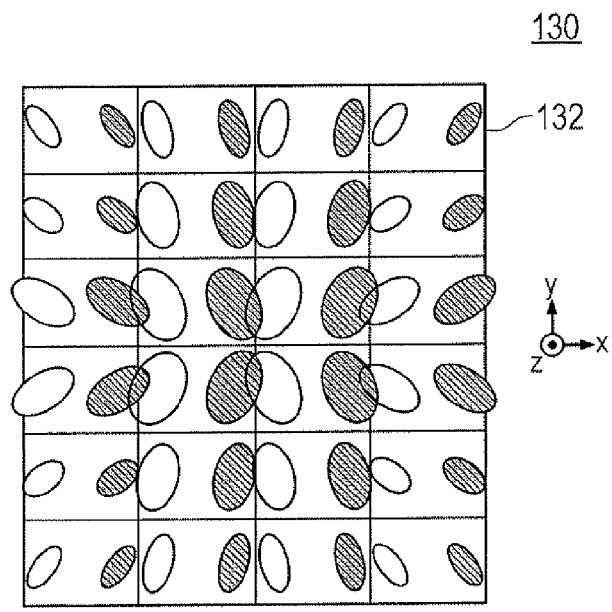
FIGS. 4A and 4B schematically illustrate arc images formed on second small lenses.
Figure 4B:
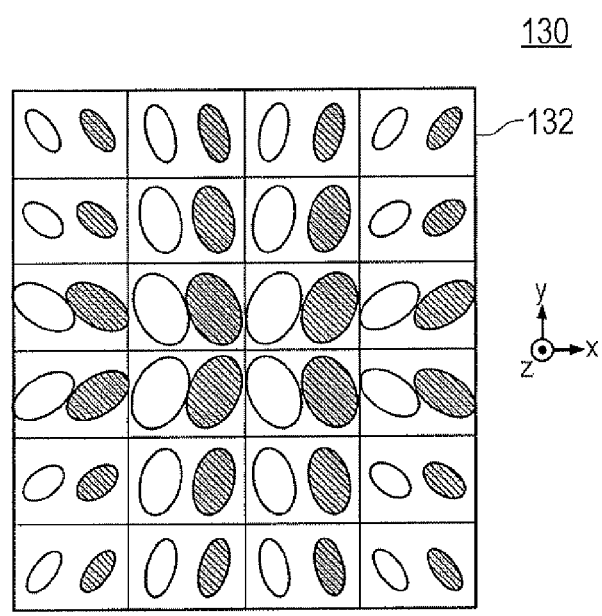

The second lens array 130 has a function of forming images of the respective first small lenses 122 of the first lens array 120 in the vicinity of the image forming areas of the liquid crystal light modulating devices 400R, 400G and 400B in cooperation with the superimposing lens 150. The plural second small lenses 132 of the second lens array 130 are arranged in a matrix having four lines and six rows on a plane perpendicular to the z axis as illustrated in FIGS. 4A and 4B as will be described later.

The polarization converting element 140 equalizes the polarization directions of the respective partial lights divided by the first lens array 120 and releases substantially one type of linear polarization light having equal polarization direction.

The polarization converting element 140 has a polarization dividing layer which transmits one linear polarization component contained in the polarization components of the illumination lights emitted from the light source devices 10 and 20 and reflects the other linear polarization component in the direction perpendicular to the illumination optical axis OC, a reflection layer which reflects the other linear polarization component reflected by the polarization dividing layer in a direction parallel with the illumination optical axis OC, and a retardation film which converts the one linear polarization component having passed the polarization dividing layer into the other linear polarization component.

The superimposing lens 150 is an optical element which converges the plural partial lights having passed the first lens array 120, the second lens array 130, and the polarization converting element 140 and superimposes the converged light in the vicinity of the image forming areas of the liquid crystal light modulating devices 400R, 400G and 400B. The superimposing lens 150 is disposed such that the optical axis of the superimposing lens 150 substantially coincides with the illumination optical axis OC. The superimposing lens 150 is constituted by a compound lens having a plurality of lenses.

The color separating and guiding system 200 has dichroic mirrors 210 and 220, and reflection mirrors 230, 240, and 250, an entrance lens 260, and a relay lens 270. The color separating and guiding system 200 separates illumination light released from the superimposing lens 150 into three color lights of red, green and blue, and guides the respective color lights to the three liquid crystal light modulating devices 400R, 400G and 400B as illumination targets.

Converging lenses 300R, 300G and 300B are disposed before the liquid crystal light modulating devices 400R, 400G and 400B on the optical path.

The liquid crystal light modulating devices 400R, 400G and 400B modulate illumination lights according to image information as the components of illumination targets of the lighting device 100.

Each of the liquid crystal light modulating units 400R, 400G and 400B is formed by airtightly sealing liquid crystals as electro-optic substances into a pair of transparent glass substrates. The liquid crystal light modulating devices 400R, 400G and 400B modulate the polarization direction of one type of linear polarized lights released from an entrance polarizing plate according to the given image information using polysilicon TFT as switching elements, for example.

Though not shown in the figure, an entrance polarizing plate is interposed between each pair of the converging lenses 300R, 300G and 300B and the liquid crystal light modulating devices 400R, 400G and 400B. Also, an exit polarizing plate is interposed between each of the liquid crystal light modulating devices 400R, 400G and 400B and the cross dichroic prism 500. The entering color lights are modulated by the entrance polarizing plates, the liquid crystal light modulating devices 400R, 400G and 400B, and the exit polarizing plates.

The cross dichroic prism 500 is an optical element which combines the light images modulated for each color light released from the exit polarizing plates to form a color image. The cross dichroic prism 500 has a substantially square shape in the plan view formed by attaching four triangular prisms. Dielectric multilayer films are provided on the substantially X-shaped boundaries of the rectangular prisms. The one dielectric multilayer film formed on one surface of the substantially X-shaped boundary reflects red light, and the other dielectric multilayer film formed on the other boundary reflects blue light. The red light and blue light are bended by the dielectric multilayer films such that these lights can travel in the same direction as that of the green light, and then the three color lights are combined.

The color image released from the cross dichroic prism 500 is enlarged and projected by the projection system 600 to form a large screen image on the screen SCR.

The two light source devices 10 and 20 and the projection system 600 are disposed in such positions that the light source optical axes 10ax and 20ax of the two light source devices 10 and 20 are substantially perpendicular to a projection optical axis 600ax of the projection system 600.

According to the projector 1000 having this structure in the first embodiment, the ellipsoidal reflectors 14 and 24 face each other, and the angle a formed by the first reflection surface 32 and the second reflection surface 34 of the reflection prism 30 is 92°. Thus, an angle θ formed by a center axis A of illumination light emitted from the light source device 10 and entering the converging lens 110 and a center axis B of illumination light emitted from the light source device 20 and entering the converging lens 110 is 2°.

The lighting device 100 of projector 1000 in the first embodiment is described in more detail in comparison with a lighting device 100a of projector 1000a in a comparison example.

Figure 3:
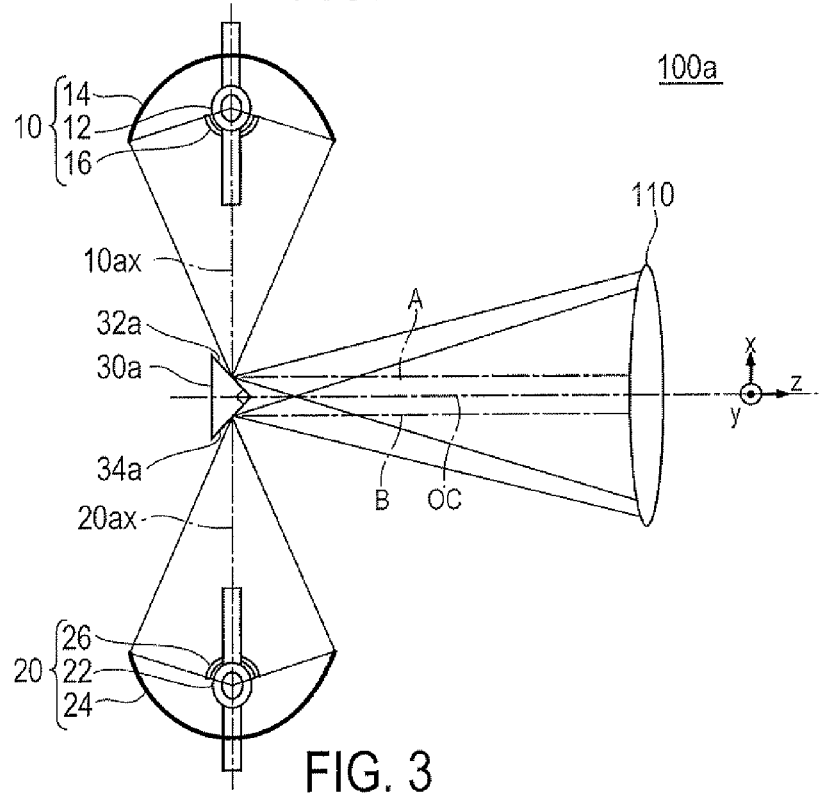
FIG. 3 is a view explaining a projector 1000*a* according to a comparison example.

FIG. 3 shows the light device 100a of projector 1000a according to the comparison example.

FIGS. 4A and 4B schematically illustrate arc images formed on the second small lenses. FIG. 4A schematically shows arc images formed by the second small lenses 132 of the projector 1000a in the comparison example, and FIG. 4B schematically illustrates arc images formed on the second small lenses 132 of the projector 1000 in the first embodiment.

The projector 1000a in the comparison example basically has a structure similar to that of the projector 1000 in the first embodiment, but has a reflection system different from that of the projector 1000 in the first embodiment.

As illustrated in FIG. 3, the lighting device 100a of projector 1000a in the comparison example includes a triangular prism 30a having two reflection surfaces 32a and 34a orthogonal to each other as the reflection system. Illumination lights emitted from the light source devices 10 and 20 are reflected by the triangular prism 30a toward the converging lens 110 disposed downstream. The converging spots of the ellipsoidal reflectors 14 and 24 exist on the reflection surfaces 32a and 34a of the triangular prism 30a, respectively.

According to the projector 1000a in the comparison example, the ellipsoidal reflectors 14 and 24 face each other, and include the triangular prism 30a as the reflection system. Thus, the angle θ formed by the center axis A of the illumination light emitted from the light source device 10 and entering the converging lens 110 and the center axis B of the illumination light emitted from the light source device 20 and entering the converging lens 110 is 0°. Thus, the projector 1000a in the comparison example has a structure similar to that of a two light source type projector in related art.

According to the projector 1000a having this structure in the comparison example, two arc images corresponding to the two light source devices 10 and 20 are formed on each of the second small lenses 132. Since the positions of the converging spots of the two ellipsoidal reflectors 14 and 24 existing on the reflection surfaces 32a and 34a of the triangular prism 30a are disposed away from each other as illustrated in FIG. 3, the two arc images are not formed within the corresponding lens cell of the second small lenses 132 as illustrated in FIG. 4A. As a result, the two arc images project out of the cell, which lowers light utilization efficiency.

According to the projector 1000a in the comparison example, it is possible to locate the converging spots of the ellipsoidal reflectors 14 and 24 close to each other by disposing the converging spots of the ellipsoidal reflectors 14 and 24 in the vicinity of the illumination optical axis OC of a lighting device 100a. In this case, however, the illumination lights from the light source devices 10 and 20 cannot be sufficiently reflected by the reflection surfaces 32a and 34a of the triangular prism 30a. Thus, the light utilization efficiency lowers.

On the other hand, the projector 1000 in the first embodiment has the reflection system (reflection prism 30) constructed such that the center axes A and B of the respective illumination lights emitted from the two light source devices 10 and 20 and entering the converging lens 110 are inclined to the illumination optical axis OC (center axis of the converging lens 110) by a predetermined angle. Thus, the two arc images can be contained within the corresponding lens cell of the second small lenses 132 as illustrated in FIG. 4B. Accordingly, higher light utilization efficiency than that of the related-art projector can be provided.

According to the projector 1000 in the first embodiment, the illumination lights from the light source devices 10 and 20 can be securely reflected toward the converging lens 110 disposed downstream by using the reflection prism 30 having the structure discussed above.

Also, according to the projector 1000 in the first embodiment, the two light source devices 10 and 20 are disposed such that the light source optical axes 10ax and 20ax are substantially perpendicular to the projection optical axis 600ax of the projection system 600. Thus, even when the projector 1000 is installed such that the projection system 600 faces the ceiling, deviation from the secured range of the projector 1000 installed in the horizontal direction is not caused. Accordingly, unfavorable phenomena such as heat generated by the arc tube can be prevented.

Second Embodiment

Figure 5:
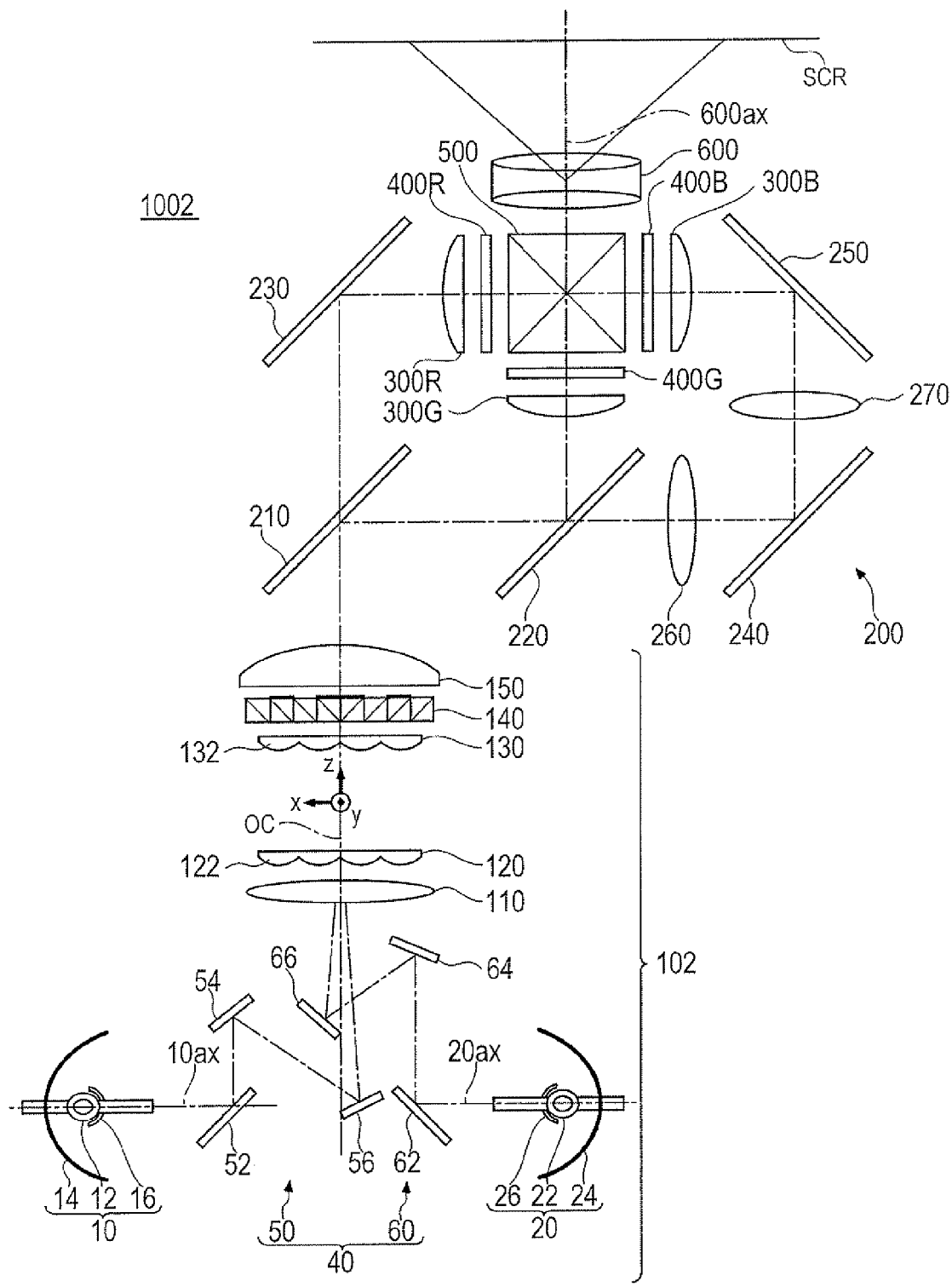
FIG. 5 illustrates optical systems included in a projector 1002 according to a second embodiment.

FIG. 5 illustrates optical systems of a projector 1002 in a second embodiment.

Figure 6:
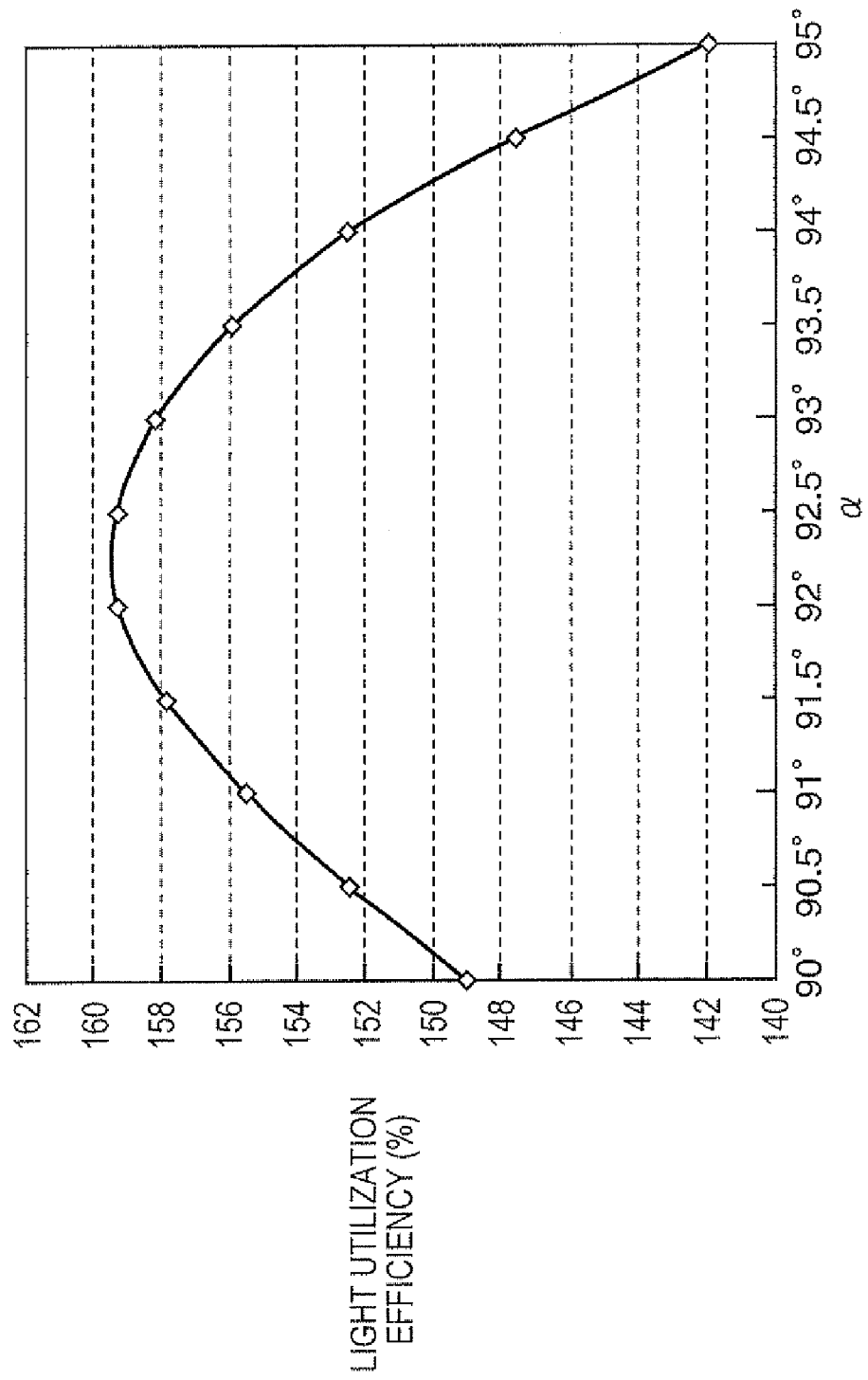
FIG. 6 shows relationship between an angle a formed by a first reflection surface and a second reflection surface and light utilization efficiency.

In FIGS. 5 and 6, similar reference numbers are given to parts and components similar to those shown in FIGS. 1 and 2, and detailed explanation of those is not repeated.

The projector 1002 according to the second embodiment basically has a structure similar to that of the projector 1000 in the first embodiment, but has a reflection system different from that of the projector 1000 in the first embodiment.

As illustrated in FIG. 5, the projector 1002 in the second embodiment includes a reflection system 40 having a first bending system 50 and a second bending system 60 as the reflection system.

The first bending system 50 has three reflection mirrors (reflection elements) 52, 54 and 56 for reflecting illumination light emitted from the light source device 10 toward the converging lens 110. The reflection mirrors 52, 54 and 56 sequentially reflect the illumination light emitted from the light source device 10. The reflection mirror 56 is disposed at the rearmost position of the positions of the reflection mirrors 52, 54 and 56 on the optical path. The reflection mirrors 52, 54 and 56 are disposed such that the center axis A of the illumination light emitted from the light source device 10 and reflected by the reflection mirror 56 is inclined to the illumination optical axis OC by a predetermined angle.

The second bending system 60 has three reflection mirrors (reflection elements) 62, 64 and 66 for reflecting illumination light emitted from the light source device 20 toward the converging lens 110. The reflection mirrors 62, 64 and 66 sequentially reflect the illumination light emitted from the light source device 20. The reflection mirror 66 is disposed at the rearmost position of the positions of the reflection mirrors 62, 64 and 66 on the optical path. The reflection mirrors 62, 64 and 66 are disposed such that the center axis B of the illumination light emitted from the light source device 20 and reflected by the reflection mirror 66 is inclined to the illumination optical axis OC by a predetermined angle.

The reflection mirror 56 disposed at the rearmost of the three reflection mirrors 52 through 56 of the first bending system 50 on the optical path and the reflection mirror 66 disposed at the rearmost of the three reflection mirrors 62 through 66 of the second bending system 60 on the optical path are disposed at different positions in the direction of the illumination optical axis OC of the lighting device 102.

Accordingly, the reflection system of the projector 1002 in the second embodiment is different from that of the projector 1000 in the first embodiment in the structure of the reflection system. However, the reflection system 40 of the projector 1002 in the second embodiment is constructed such that the center axes A and B of the illumination lights emitted from the two light source devices 10 and 20 and entering the converging lens 110 are inclined to the illumination optical axis OC (center axis of the converging lens 110) by a predetermined angle. Thus, similarly to the projector 1000 in the first embodiment, two arc images can be formed within the corresponding lens cell of the second small lenses 132. As a result, higher light utilization efficiency than that of a projector in related art can be provided.

Moreover, according to the projector 1002 in the second embodiment, the illumination lights emitted from the light source devices 10 and 20 can be securely reflected toward the converging lens 110 disposed downstream by using the reflection system 40 having the structure described above.

Also, according to the projector 1002 in the second embodiment, the two light source devices 10 and 20 are disposed such that the light source optical axes 10ax and 20ax are substantially perpendicular to the projection optical axis 600ax of the projection system 600. Thus, even when the projector 1002 is installed such that the projection system 600 faces the ceiling, deviation from the secured range of the structure installed in the horizontal direction is not caused. Accordingly, unfavorable phenomena such as heat generated by the arc tube can be prevented.

Furthermore, the projector 1002 in the second embodiment includes the reflection system 40 having the first bending system 50 and the second bending system 60 having the structure discussed above as the reflection system. Thus, the projector can be made relatively compact.

According to the projector 1002 in the second embodiment, the reflection mirror 56 of the first bending system 50 and the reflection mirror 66 of the second bending system 60 are disposed at different positions in the direction of the illumination optical axis OC of the lighting device 102. Thus, the possibility that a part of light entering the one reflection mirror (reflection mirror 56, for example) is deviated by the other reflection mirror (reflection mirror 66, for example) can be reduced.

Experiment Example

This experiment is executed to confirm that the reflection system constructed such that the center axes of the respective illumination lights emitted from the two light source devices and entering the converging lens are inclined toward the illumination optical axis of the lighting device by a predetermined angle can provide higher light utilization efficiency than that of the related-art structure. In this experiment, the reflection prism having the first reflection surface and the second reflection surface as the reflection system is used, and light utilization efficiency of the projector is calculated by simulation while varying the angle a formed by the first reflection surface and the second reflection surface with plural steps.

FIG. 6 shows the relationship between the angle a formed by the first reflection surface and the second reflection surface and the light utilization efficiency. The values of light utilization efficiency indicated by the vertical axis are calculated assuming that light utilization efficiency is 200% when all the illumination lights emitted from the two light source devices 10 and 20 are utilized.

The reflection prism having 90° as the angle α formed by the first and second reflection surfaces is a triangular prism. More specifically, when α is 90°, the projector in this experiment has a structure similar to that of the projector 1000a in the comparison example. In this case, the angle θ formed by the center axis A of the illumination light emitted from the light source device 10 and entering the converging lens 110 and the center axis B of the illumination light emitted from the light source device 20 and entering the converging lens 110 becomes 0° (see FIG. 3).

According to the result of the simulation, in the range of 90.5°≦a≦94°, at least 3% higher light utilization efficiency can be obtained compared with the light utilization efficiency (149%) when a is 90° as illustrated in FIG. 6. More specifically, when the angle q formed by the center axis A of the illumination light emitted from the light source device 10 and entering the converging lens 110 and the center axis B of the illumination light emitted from the light source device 20 and entering the converging lens 110 is in the range of 0.5°≦q≦4°, light utilization efficiency is at least 3% higher compared with the light utilization efficiency when q is 0°.

As can be seen from this experiment, it is confirmed that light utilization efficiency higher than that of the related-art structure can be obtained by using the reflection system constructed such that the center axes of the respective illumination lights emitted from the two light source devices and entering the converging lens are inclined toward the illumination optical axis of the lighting device by a predetermined angle.

The invention is not limited to the embodiments described and depicted herein, and it is therefore intended that various modifications and changes may be made without departing from the scope and spirit of the invention. For example, the following modifications may be made.

(1) According to the above embodiments, the reflection prism having two reflection surfaces is used as the reflection system in the first embodiment. However, two reflection mirrors may be employed as the reflection system.

(2) According to the second embodiment, the reflection system constituted by the six reflection mirrors in total is included as the reflection system. However, a reflection system having six reflection prisms may be used. In addition, the number of the reflection mirrors constituting the reflection system is six in the second embodiment, but the number of the reflection mirrors may be five or smaller or seven or larger.

(3) According to the above embodiments, the second lens array contains the plural second small lenses arranged in a matrix having four lines and six rows on a plane perpendicular to the z-axis. However, the second lens array may have the plural second small lenses arranged in different manners.

(4) According to the above embodiments, the sub mirror is used as the reflection unit provided on the arc tube. It is also preferable, however, to use reflection coating as the reflection unit. Moreover, while the sub mirror as the reflection unit is provided on the arc tube in the above embodiments, the reflection unit such as sub mirror may be eliminated.

(5) The projectors 1000 and 1002 in the first and second embodiments are both transmission type projectors. However, the invention is applicable to reflection type projectors. The "transmission type" refers to a type including an electro-optic modulating device as a light modulating unit such as a transmission type liquid crystal light modulating device which transmits light. The "reflection type" refers to a type including an electro-optic modulating device as a light modulating unit such as a reflection type liquid crystal light modulating device which reflects light. Advantages similar to those of the transmission type projector can be offered even when the invention is applied to the reflection type projector.

(6) According to the above embodiments, the projector includes the three liquid crystal light modulating devices 400R, 400G and 400B. However, the invention is applicable to a projector including one, two, four, or more liquid crystal light modulating devices.

(7) According to the above embodiments, the liquid crystal light modulating devices are used as the electro-optic modulating devices. However, the electro-optic modulating devices may be any devices as long as they can generally modulate entering light according to image information such as micromirror type light modulating device. The micromirror type light modulating device may be constituted by DMD (digital micromirror device; trademark of TI corporation), for example.

(8) The invention is applicable to both a front projection type projector which projects a projection image from the viewing side, and to a rear projection type projector which projects a projection image from the side opposite to the projection image viewing side.

What is claimed is:

1. A projector, comprising:
   a lighting device which includes
      two light source devices each of which has an ellipsoidal reflector and an arc tube having a light emission center in the vicinity of a first focus of the ellipsoidal reflector and is disposed such that the two ellipsoidal reflectors face each other,
      a reflection system which has a reflection element in the vicinity of a second focus of each of the ellipsoidal reflectors and reflects illumination lights emitted from the two light source devices substantially in the same direction,
      a converging lens which guides the illumination light coming from the reflection system to an optical element disposed downstream,
      a first lens array which has a plurality of first small lenses for dividing the light guided by the converging lens into a plurality of partial lights,
      a second lens array which has second small lenses corresponding to the first small lenses of the first lens array, and
      a superimposing lens which superimposes the respective partial lights emitted from the second lens array on an illumination target area;
   an electro-optic modulating device which modulates the light emitted from the lighting device according to image information; and
   a projection system which projects light modulated by the electro-optic modulating device,
   wherein
      the two light source devices are disposed in such positions that the respective light source optical axes of the two light source devices are substantially perpendicular to the projection optical axis of the projection system, and the reflection system is constructed such that the center axes of the respective illumination lights reflecting from the reflection element and entering the converging lens are inclined toward an illumination optical axis of the lighting device by a predetermined angle.

2. The projector according to claim 1, wherein:
when the angle formed by the center axis of the illumination light emitted from one of the two light source devices, reflecting from the reflection element and entering the converging lens and the center axis of the illumination light emitted from the other light source device of the two light source devices, reflecting from the reflection element and entering the converging lens is θ, the relation $0.5° \leq θ \leq 4°$ holds.

3. The projector according to claim 1, wherein:
the reflection system is a reflection prism which has a first reflection surface for reflecting the illumination light emitted from one of the two light source devices toward the converging lens, and a second reflection surface for reflecting the illumination light emitted from the other light source device of the two light source devices toward the converging lens; and
when the angle formed by the first reflection surface and the second reflection surface is α, the relation $90.5° \leq α \leq 94°$ holds.

4. The projector according to claim 1, wherein the reflection system includes a first bending system which has three reflection elements for reflecting the illumination light emitted from one of the light source devices of the two light source devices toward the converging lens, and a second bending system which has three reflection elements for reflecting the illumination light emitted from the other light source device toward the converging lens.

5. The projector according to claim 4, wherein the reflection element disposed at the rearmost position of the positions of the three reflection elements of the first bending system on the optical path is disposed at a position different from the position of the reflection element disposed at the rearmost position of the positions of the three reflection elements of the second bending system on the optical path in the direction of the illumination optical axis of the lighting device.

6. A reflection system comprising:
a light-emitting means for emitting a plurality of illumination lights;
a reflection means;
and an optical element for converging the plurality of illumination lights, wherein the reflection means reflects the plurality of illumination lights substantially in the direction of the optical element, the reflection means being constructed such that the center axes of the respective illumination lights reflecting from the reflection means and entering the optical element are inclined toward an illumination optical axis of the optical element at a predetermined angle.

7. The reflection system of claim 6, the at least two sources of the plurality of illumination lights being disposed to face each other such that respective light source optical axes of the two sources are substantially parallel.

8. The reflection system of claim 7, the at least two sources of the plurality of illuminations lights are ellipsoidal reflectors.

9. The reflection system of claim 6, the at least two sources of the plurality of illuminations lights are ellipsoidal reflectors.

* * * * *